United States Patent [19]

Hill

[11] Patent Number: 5,059,028

[45] Date of Patent: Oct. 22, 1991

[54] RING LASER GYROSCOPE HAVING MEANS FOR MAINTAINING THE BEAM INTENSITY

[75] Inventor: Roger Hill, Midlothian, Scotland

[73] Assignee: GEC Ferranti Defence Systems Limited, Stanmore, United Kingdom

[21] Appl. No.: 472,372

[22] Filed: Feb. 1, 1990

[30] Foreign Application Priority Data

Feb. 3, 1989 [GB] United Kingdom ............... 8902381

[51] Int. Cl.⁵ ........................................... G01C 19/66
[52] U.S. Cl. ................................... 356/350; 372/31; 372/94
[58] Field of Search ..................... 356/350; 372/94, 31

[56] References Cited

U.S. PATENT DOCUMENTS

| | | | |
|---|---|---|---|
| 4,284,964 | 8/1981 | Maier, Jr. | 356/350 X |
| 4,514,087 | 4/1985 | Vescial | 356/350 |
| 4,890,923 | 1/1990 | Buschelberger | 356/350 |

FOREIGN PATENT DOCUMENTS

| | | | |
|---|---|---|---|
| 3148925 | 6/1983 | Fed. Rep. of Germany | 356/350 |
| 2185846 | 7/1987 | United Kingdom | 356/350 |

*Primary Examiner*—Vincent P. McGraw
*Attorney, Agent, or Firm*—Kerkam, Stowell, Kondracki & Clarke

[57] ABSTRACT

A closed path (14) around which two beams of laser radiation may pass in opposite directions is formed in a block (10) of material and is defined by at least three mirrors (11, 12 13). One of these mirrors (11) is partially transmissive of laser radiation in each beam and has detector means (17, 18) associated with it to derive electrical signals dependent upon the rotational forces acting on the gyroscope about an axis 19. A second mirror (12) is totally reflecting and is associated with a transducer (20) which continuously moves the mirror. Second detector means (21) is responsive to laser radiation in the two beams to derive alternating-current signals to control the transducer (20). Control means (22) respond to the direct-current component of the output of the second detector means (21) to maintain the intensity of the laser beams at a constant value.

2 Claims, 2 Drawing Sheets

RING LASER GYROSCOPE HAVING MEANS FOR MAINTAINING THE BEAM INTENSITY

This invention relates to ring lasers and in particular to the control of beam intensity in ring laser gyroscopes.

One common form of ring laser gyro comprises a solid block of material having appropriate thermal and optical properties in which is formed a triangular optical path comprising three straight passages formed in the block and having a mirror at each apex. The three passages communicate with one another and contain a gaseous active lasing medium which is excited to produce a discharge in the gas. The discharge may be produced by providing one or more anode and cathode electrodes in, or in communication with, the passages and connected to a suitable DC power supply. However, since the use of DC power tends to lead to problems due to electrode sputtering or variation of the constituents of the gaseous active medium, it is becoming the practice to use RF excitation to produce the gas discharge. Excitation may be produced between one or more pairs of elongated electrodes, with the electrodes of each pair located on opposite sides of the passages on the outside of the block so that RF power from a suitable source is capacitvely coupled into the gas. A convenient excitation frequency is of the order of 1 GHz. Whatever excitation technique is used the gas discharge causes laser action which results in a first beam of laser radiation passing around the optical path in a clockwise direction and a second beam of laser radiation of the same frequency passing around the optical path in the opposite direction.

In the ring laser gyroscope a first one of the three apex mirrors is arranged to be partially transmitting so that a small proportion of the laser radiation in each of the clockwise and counter-clockwise beams may leave the laser cavity and pass to a suitable readout detector. This provides electrical signals which are used to determine the magnitude of any rotational forces applied to the laser block about an axis perpendicular to the plane of the optical path.

A second one of the apex mirrors is made to be 100% reflecting and is usually caused to oscillate through a very small distance as part of a mechanism provided to stabilise the length of the optical path within the laser cavity. The third apex mirror may be made partially transmitting and a detector is provided to control the path length mechanism. Alternatively, part of the laser radiation passing through the first mirror may be diverted and used for this purpose.

One of the factors which will lead to drift in a ring laser gyroscope is that of variations in the intensity of the laser beams produced in the laser cavity. Control of beam intensity is therefore necessary to eliminate this source of error. In the case of a DC-excited gas discharge it is possible to measure the discharge current which is related to laser beam intensity. However, unwanted thermal effects and other factors introduce errors into this simple method of control. In the case of an RF-exicted gas discharge the high frequencies used make it difficult to measure discharge current with any reasonable degree of accuracy.

Ring laser gyros of the multioscillator type are also known in which at least four mirrors are used and in which part of the closed path of the laser beam lies in a different plane to the rest of the path. The same problems of maintaining constant beam intensity apply equally to ring laser gyros of this type.

It is an object of the present invention to provide a ring laser gyroscope in which the intensity of the beam of laser radiation may be accurately controlled.

According to the present invention there is provided a ring laser gyroscope which includes means for producing two counter-rotating beams of laser radiation around a closed path defined by at least three reflecting surfaces, a first one of said surfaces being partially transmissive of the radiation in each beam, first detector means responsive to the laser radiation passing through said first mirror to derive electrical signals dependent upon the rotational forces acting upon the ring laser gyroscopes about a predetermined axis, a second one of said surfaces being totally reflecting and being associated with transducer means operable to vary continuously the position of said second mirror, second detector means responsive to laser radiation in each of said beams to derive alternating-current signals to control the transducer means, and control means responsive to the direct-current component of the output of said second detector means to maintain the intensity of the laser beams at a constant value.

A third reflector surface of the ring laser gyroscope may be partially transmissive of the radiation in each beam with the second detector means arranged to respond to the radiation passing through the third surface.

The invention will now be described with reference to the accompanying drawings, in which.

Figure 1:
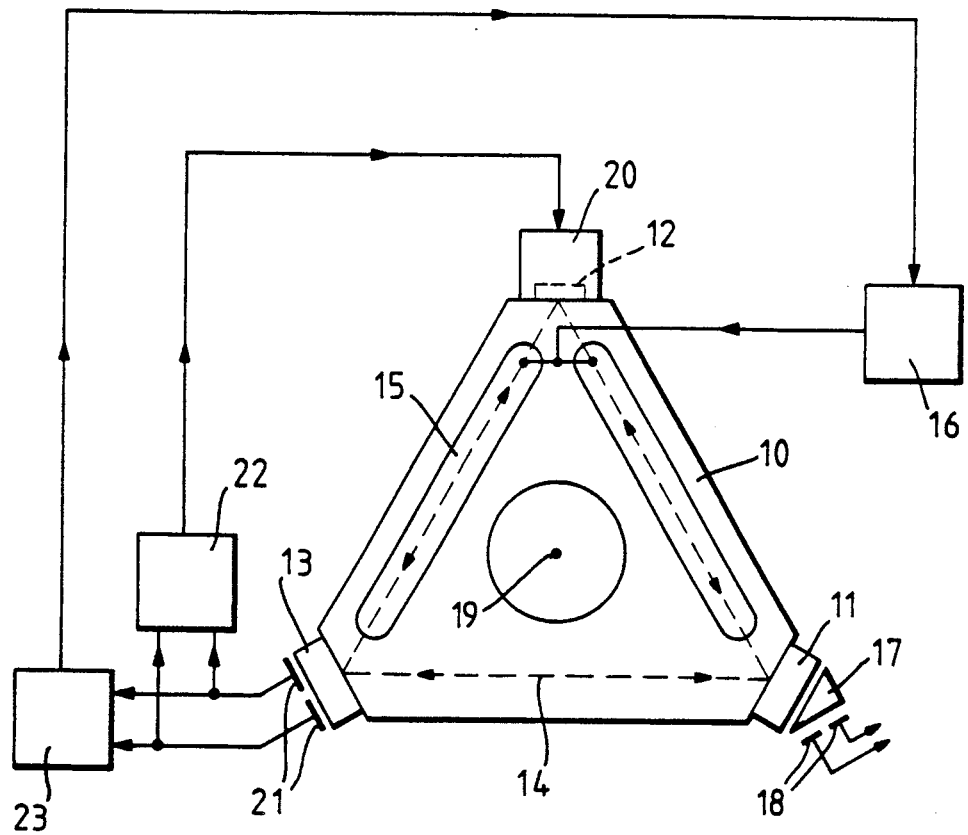
FIG. 1 is a schematic plan view of an RF-excited ring laser gyroscope.

Referring now to FIG. 1, this shows a simple laser gyroscope formed by providing three passages forming an equilateral triangle in a block 10 of material having suitable thermal and electrical properties. Three mirrors 11, 12 and 13 are provided, one at each apex of the triangular closed path 14. The cavity making up the closed path 14 is fitted with a suitable gaseous laser medium, such as a mixture of helium and neon, and one or more of the legs of the cavity is excited by an RF-excited gas discharge. The discharge is produced between one or more pairs of electrodes 15, diametrically opposite one another along part of the length of the leg of the cavity. In the illustration excitation electrodes are provided on two legs of the cavity and are supplied with RF power at, say, 1 GHz by a power source 16. Excitation of the laser medium produces a beam of laser radiation passing in each direction around the closed path 14. For convenience these counter-rotating beams will be referred to as the clockwise (CW) and counter-clockwise (CCW) beams.

The mirror 11 is made partially transmitting so that a small proportion of the energy in the two laser beams passes through the mirror onto a detector. This detector includes a prism 17 and a pair of photo-electric devices 18. The outputs from these devices pass to known circuitry (not shown) which determines the rotational forces acting upon the gyroscope about the axis 19 perpendicular to the plane of the closed path 14.

Mirror 12 is totally reflecting and is mounted on a transducer 20 which is operable to apply a continuous oscillation to the mirror in a direction perpendicular to the plane of its surface. This is done for the purpose of controlling the length of the closed path 14. The transducer is controlled by the outputs of a pair of photoelectric devices 21 which measure the light from the two laser beams passing through the mirror 13 which is partially transmissive. The output from these devices 21 constitutes an alternating current signal at the frequency of the oscillation applied by transducer 20 and is applied to a circuit 22 controlling the transducer.

The intensity of the laser beams is indicated by the direct-current output of the photo-electric devices 21 and this is applied to a control circuit 23 to control the excitation of the gas discharge power supply 16.

Figure 2:
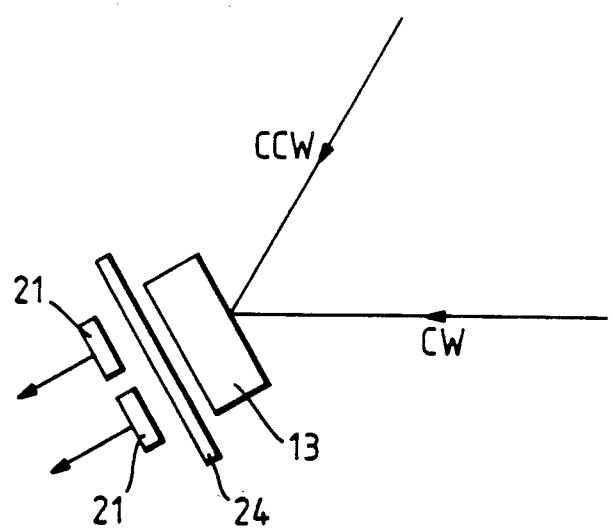
FIG. 2 illustrates further detail of a first embodiment of the ring laser gyroscope of FIG. 1.

FIG. 2 shows the mirror 13 and photo-electric devices 21 in greater detail. A narrow band optical filter 24 is placed between the mirror 13 and the detectors 21 to filter out radiation at frequencies emitted by the gas discharge and to pass to the devices 21 only radiation at the frequency of the laser beams themselves.

Figure 3:
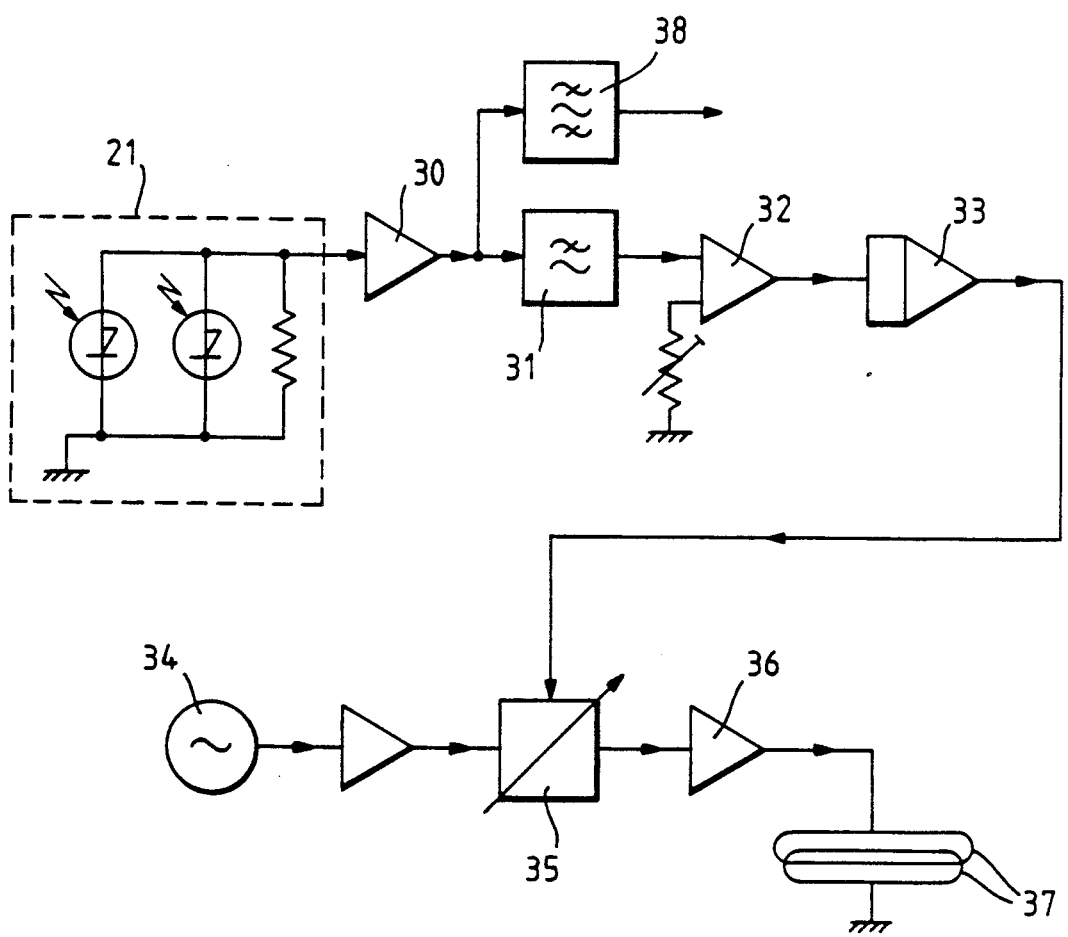
FIG. 3 is a circuit diagram of the control means of the invention.

FIG. 3 illustrates one form of control circuit which may be used with the arrangement of FIGS. 1 and 2. The photo-electric devices are indicated at 21 and their outputs are applied to a summing amplifier 30. The output of the summing amplifier is passed through a low pass filter 31 to remove the alternating component of the detector output and is applied to a comparator 32 where it is compared with a reference voltage and applied to an integrator 33.

Oscillator 34 generates the 1 GHz signal for exciting the gas discharge and the output of this oscillator is passed through a variable attenuator 35 controlled by the output of the integrator 33. The output of the attenuator is amplified by a power amplifier 36 and applied to the excitation electrodes shown schematically at 37.

The output of summing amplifier is also applied through a band-pass filter 38 to a cavity length control circuit as already mentioned.

In operation, the direct current component of the output of the low pass filter 31 is a measure of the intensity of the laser beams and is compared with a reference value to provide an error signal. This error signal is used, after integration, to control the power supplied to the gas discharge so as to keep the laser beam intensity at a constant value.

It will be appreciated that the circuit described could be modified so as to control the current applied to a DC-excited gas discharge using the same arrangement of detectors.

I claim:

1. A ring laser gyroscope of the gas discharge type which includes means for producing two counter-rotating beams of laser radiation around a closed path defined by at least three mirrors, a first one of said mirrors being partially transmissive of the radiation in each beam, first detector means responsive to the laser radiation passing through such first mirror to derive electrical signals dependent upon the rotational forces acting upon the ring laser gyroscopes about a predetermined axis, a second one of said mirrors being totally reflecting and being associated with transducer means operable to vary continuously the position of said second mirror, second detector means responsive to laser radiation in each of said beams to derive alternating-current signals to control the transducer means, control means responsive to the direct-current component of the output of said second detector means to maintain the intensity of the laser beams at a constant value, and an optical filter placed in the path of radiation directed onto said second detector means and arranged to filter out radiation generated by the gas discharge.

2. A gyroscope as claimed in claim 1 in which the third mirror is partially transmissive of the radiation in each beam, the second detector means being responsive to laser radiation passing through said mirror.

* * * * *